United States Patent [19]

Crowther et al.

[11] Patent Number: 4,636,854
[45] Date of Patent: Jan. 13, 1987

[54] TRANSMISSION SYSTEM

[75] Inventors: Gerald O. Crowther, Sutton; Arthur G. Mason, Hampshire, both of England

[73] Assignees: U.S. Philips Corporation, New York, N.Y.; Independent Broadcasting Authority, London, England

[21] Appl. No.: 622,503

[22] Filed: Jun. 20, 1984

[30] Foreign Application Priority Data

Jun. 20, 1983 [GB] United Kingdom ............... 8316751

[51] Int. Cl.⁴ .................. H04N 7/167; H04N 7/16; H04K 7/100
[52] U.S. Cl. .................................. 358/123; 358/121; 358/114
[58] Field of Search ......................... 358/121–123, 358/114; 178/22.08–22.14

[56] References Cited

U.S. PATENT DOCUMENTS

| | | | |
|---|---|---|---|
| 4,070,693 | 1/1978 | Shutterly | 358/123 |
| 4,245,245 | 1/1981 | Matsumoto | 358/121 |
| 4,266,243 | 5/1981 | Shutterly | 358/121 |
| 4,424,532 | 1/1984 | Den Toonder | 358/121 |
| 4,484,027 | 11/1984 | Lee et al. | 358/122 |
| 4,547,802 | 10/1985 | Fogarty et al. | 358/123 |

Primary Examiner—Stephen C. Buczinski
Assistant Examiner—Melissa L. Koltak
Attorney, Agent, or Firm—Thomas A. Briody; Jack Oisher; William J. Streeter

[57] ABSTRACT

In a television receiver for a transmission system in which the video signal is scrambled to allow only for its authorized reception, a video signal processor (8) is provided in which the scrambled video signal is descrambled. A low rate encrypted signal present at an output (11) of a sound/data signal processor (10) is decrypted and employed to periodically set (say once every one or two seconds) a master pseudo ramdom pulse generator (12B) producing an output of pseudo random configuration at the frame rate which is used to periodically set a video slave pseudo random pulse generator (15) to produce an output of pseudo random configuration at line frequency. This is applied to an input S of the processor (8) and forms the scrambling key for the line-by-line de-scrambling of the video signal. The sound/data components, which are packet multiplexed, are also scrambled at packet rate to allow only for their authorized reception, the sound/data signal processor (10) additionally performing the de-scrambling of the sound/data components. The output of the master pseudo random generator (12B) is also used to periodically set a number of slave pseudo random pulse generators (17, 18, 19) which produce outputs of pseudo random configuration at packet frequency applied to inputs S1, S2, S3 of the processor (10) and which form the respective scrambling packet keys for the de-scrambling of the scrambled sound/data components. The advantage obtained is that a low rate encryption key need only be transmitted to produce the required scrambling keys for both video and sound/data.

21 Claims, 2 Drawing Figures

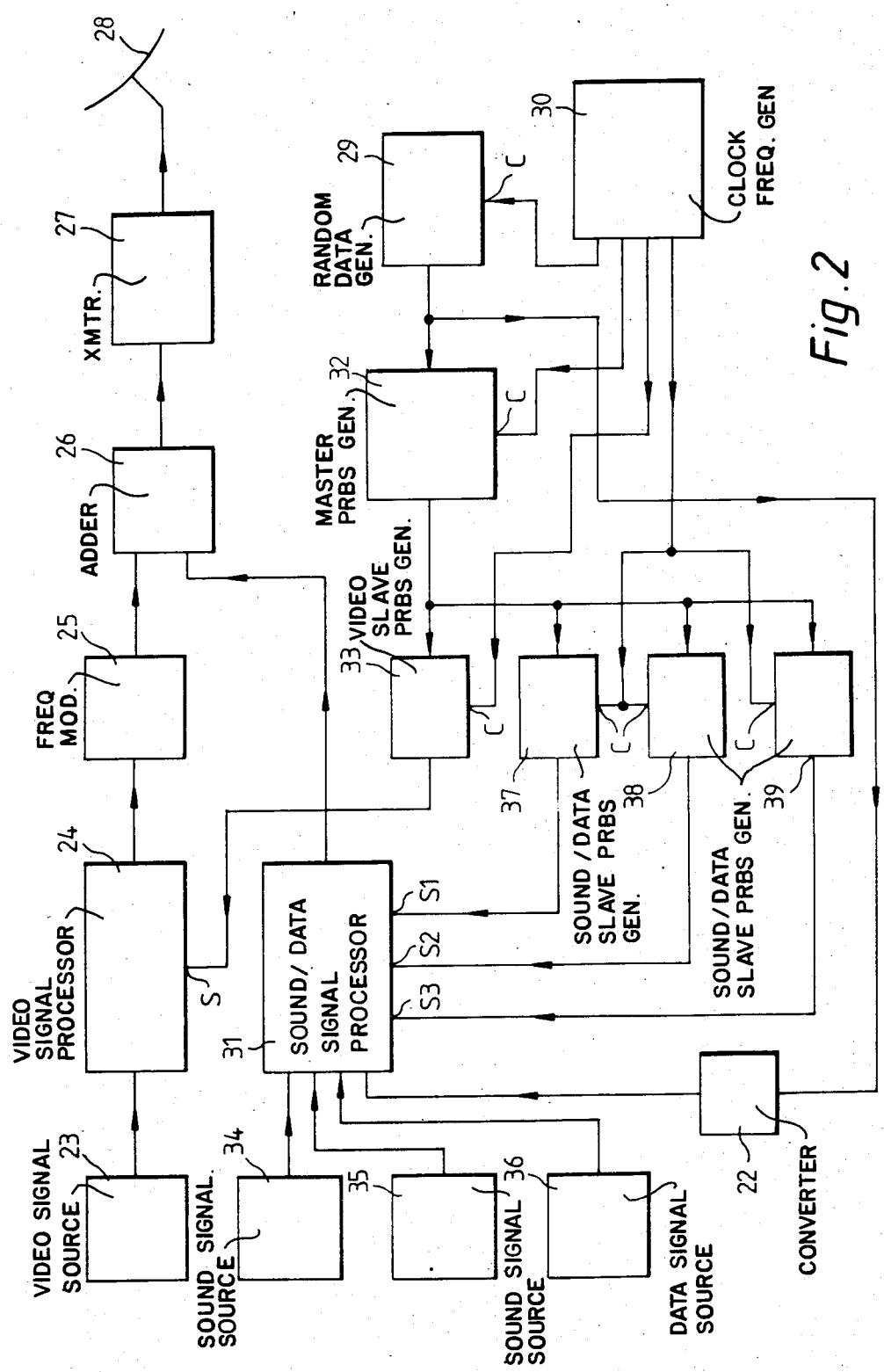

4,636,854

TRANSMISSION SYSTEM

BACKGROUND OF THE INVENTION

The invention relates a television transmission system in which the video components of a transmitted television signal are scrambled to allow only for their authorized reception, a video scrambling key being provided for the line-by-line scrambling or de-scrambling of said video components, said video scrambling key comprising a first pulse signal having a first pseudo random configuration generated at a first rate which corresponds to that of the line frequency, the first pulse signal being periodically set, in response to control data having a rate which is low compared with that of the line frequency, to a particular pulse configuration, which first pulse signal thereafter is stepped in accordance with its random configuration. The invention also relates to transmission and receiving equipment for use with such a system.

A system of the above type is known where each line of the video components of a television signal is scrambled, by cutting the line and changing the cut-point for each line. This is done in a random manner by a locally generated random video scrambling key at the transmission source and a corresponding random video scrambling key locally generated in the television receiver. Both scrambling keys are periodically reset by control data at a rate which is low relative to that of the line rate of the television signal, which control data is transmitted with the television signal. Such a method provides a relatively secure scrambling system for the video components.

With the above known system, no provision is made for scrambling or descrambling either sound or data signals transmitted with the video components of the television signal and there are circumstances where such scrambling could be required to prevent their unauthorized reception.

SUMMARY OF THE INVENTION

It is an object of the invention to provide a television transmission system where the scrambling or descrambling of sound or data signals may readily be achieved.

The invention provides a television transmission system in which the video components of a transmitted television signal are scrambled to allow only for their authorized reception, a video scrambling key being provided for the line-by-line scrambling or de-scrambling of said video components, said video scrambling key comprising a first pulse signal having a first pseudo random configuration generated at a first rate which corresponds to that of the line frequency, the first pulse signal being periodically set, in response to control data having a rate which is low compared with that of the line frequency, to a particular pulse configuration, which first pulse signal thereafter is stepped in accordance with its random configuration, characterized in that said television signal additionally contains digitally modulated sound or data components which are packet multiplexed such that individual packets represent a sound or a data component, the packets being time-division-multiplexed within periods allotted in said television signal, one of said sound/data components being scrambled to allow only for authorized reception, a packet scrambling key being provided for the packets of the sound/data component which is to be scrambled or de-scrambled, said packet scrambling key comprising a second pulse signal having a second pseudo random configuration generated at a second rate corresponding to the rate at which said packets appear either prior to or after multiplexing or demultiplexing, the second pulse signal being periodically set, in response to said control data, to a particular pulse configuration, which second pulse signal thereafter is stepped in accordance with its random configuration.

Where futher of said sound/data components are scrambled, to allow only for their authorized reception, a separate packet scrambling key may be provided for each futher sound/data component which is to be scrambled or de-scrambled. In order to produce these separate packet scrambling keys, the system may further include further second pulse signals each having a pseudo random configuration generated at the rate at which the packets of the further sound/data components appear either prior to or after multiplexing or demultiplexing, which further second pulse signals are periodically set, in response to said control data, to respective particular pulse configurations, which further second pulse signals thereafter are stepped in accordance with their random configuration.

A third pulse signal having a third pseudo random configuration may be produced at a rate less than that of said line frequency but greater than that of said control data, said third pulse signal being periodically set by said control data to a particular pulse configuration, which third pulse signal thereafter is stepped in accordance with its random configuration, the, or each, second pulse signal being periodically set by said third pulse signal. The use of such a third pulse signal provides an intermediate frequency rate which may have particular benefits. The rate of this third pulse signal may conveniently correspond to the frame frequency of the television signal.

The control data may be conveyed in encrypted form as an encryption key which forms part of the transmission with said sound/data components, this giving added security to the system.

The invention also provides television transmission equipment for use with the above transmission system, said equipment comprising a source of video components, means for performing line-by-line scrambling of said, video components under the control of a video scrambling key to allow only for their authorized reception, means for generating control data at a rate which is low compared with the line frequency of said television signal, means for generating a first pulse signal having a first pseudo random configuration at a first rate corresponding to that of said line frequency, said first pulse signal forming the video scrambling key, means for periodically setting said first pulse signal, in response to said control data, to a particular pulse configuration, which first pulse signal is thereafter stepped in accordance with its random configuration, and means for applying said scrambled video components as part of a television signal to a transmission medium, characterized in that said equipment additionally comprises sources of digitally modulated sound or data components, means for packet multiplexing said sound/data components such that individual packets represent a sound or a data component, said packets being multiplexed within allotted periods, means for scrambling one of said sound/data components, under the control of a packet scrambling key, to allow only for authorized reception, means for generating a second pulse signal having a second pseudo random configuration at a second rate corresponding to the rate at which said packets appear, either prior to or after multiplexing, said second pulse signal forming said packet scrambling key, means for periodically setting said second pulse signal, in response to said control data, to a particular pulse configuration, which second pulse signal is thereafter stepped in accordance with its random configuration, and means for applying said packet multiplexed sound/data components as part of said television signal to the transmission medium.

Such transmission equipment may additionally comprise means for scrambling further of said sound/data components, each under the control of a separate packet scrambling key, to allow only for authorized reception, means for generating further second pulse signals each having a pseudo random configuration at rates at which the packets of the further sound/data components appear, either prior to or after multiplexing, said further second pulse signals forming the respective separate packet scrambling keys, means for periodically setting said further second pulse signals, in response to said control data, to particular pulse configurations, which further second pulse signals are thereafter stepped in accordance with their random configurations.

Further generating means may be provided for generating a third pulse signal having a third pseudo random configuration at a rate which is less than that of the, or each, further second pulse signals but greater than that of said control data, means for periodically setting said third pulse signal, by said control data, to a particular pulse configuration, which third pulse signal thereafter is stepped in accordance with its random configuration, and means for periodically setting the, or each, further second pulse signal by said third pulse signal. This means for generating said third pulse signal may generate said third pulse signal at a rate corresponding to the frame frequency of said television signal.

With transmission equipment as above, means may also be provided for encrypting said control data to form an encryption key which encryption key forms one of the sound/data components.

The invention further provides television receiver equipment for use with the above transmission system which comprises means for receiving said television signal and for deriving the scrambled video components therefrom, means for performing line-by-line descrambling of said scrambled video components under the control of a video scrambling key, means for generating a first pulse signal having a first pseudo random configuration at a first rate corresponding to that of the line frequency, said first pulse signal forming said video scrambling key, means for periodically setting said first pulse signal, in response to received control data having a rate which is low comprised with that of the line frequency, to a particular pulse configuration, and which first pulse signal is thereafter stepped in accordance with its random configuration, characterized in that said television signal additionally contains digitally modulated sound or data components which are packet multiplexed such that individual packets represent a sound or a data component, said packets being time-division-multiplexed within periods allotted in said television signal, one of said sound/data components being scrambled to allow only for authorized reception, said television receiver equipment additionally comprising means for deriving said one scrambled sound/data component from said received television signal, means for performing descrambling of said scrambled sound/data component under the control of a packet scrambling key, means for generating a second pulse signal having a second pseudo random configuration at a second rate corresponding to the rate at which said packets appear, either prior to or after de-multiplexing, said second pulse forming said packet scrambling key, means for periodically setting said second pulse signal, in response to said received control data, to a particular pulse configuration, which second pulse signal is thereafter stepped in accordance with its random configuration.

Where further of the sound/data components are scrambled to allow only for their authorized reception, the equipment may additionally comprise means for deriving said further scrambled sound/data components from said received television signal, means for performing descrambling of said further scrambled sound/data components under the control of separate packet scrambling keys, means for generating further second pulse signals each having a pseudo random configuration at rates at which the packets of the further scrambled sound/data components appear, either prior to or after demultiplexing, said further second pulse signals, forming the respective separate packet scrambling keys, means for periodically setting said further second pulse signals, in response to said received control data, to particular pulse configurations, which further second pulse signals are thereafter stepped in accordance with their random configurations.

Such receiver equipment may additionally comprise means for generating a third pulse signal having a third pseudo random configuration at a rate which is less than that of said control data, means for periodically setting said third pulse signal, by said received control data, to a particular configuration, which third pulse signal thereafter is stepped in accordance with its random configuration, and means for periodically setting the, or each, further second pulse signal by said third pulse signal. The means for generating the third signal may be included in a sub-system which means that the pulses at the output of this sub-system are at a rate which is lower than the packet. This means for generating said third pulse signal may generate this third pulse signal at a rate corresponding to the frame frequency of said television signal.

If the control data is conveyed in the sound/data components of said television signal in encrypted form as an encryption key, said equipment may further comprise means for deriving said encryption key from said sound/data components and means for decrypting said encryption key to produce said control data.

DESCRIPTION OF THE DRAWINGS

The above and other features of the invention will be more readily understood from the following description with reference to the accompanying drawings, in which:

FIG. 2 is a block diagram of a television transmitter for use with the present invention.

DESCRIPTION OF THE PREFERRED EMBODIMENT

Figure 1:
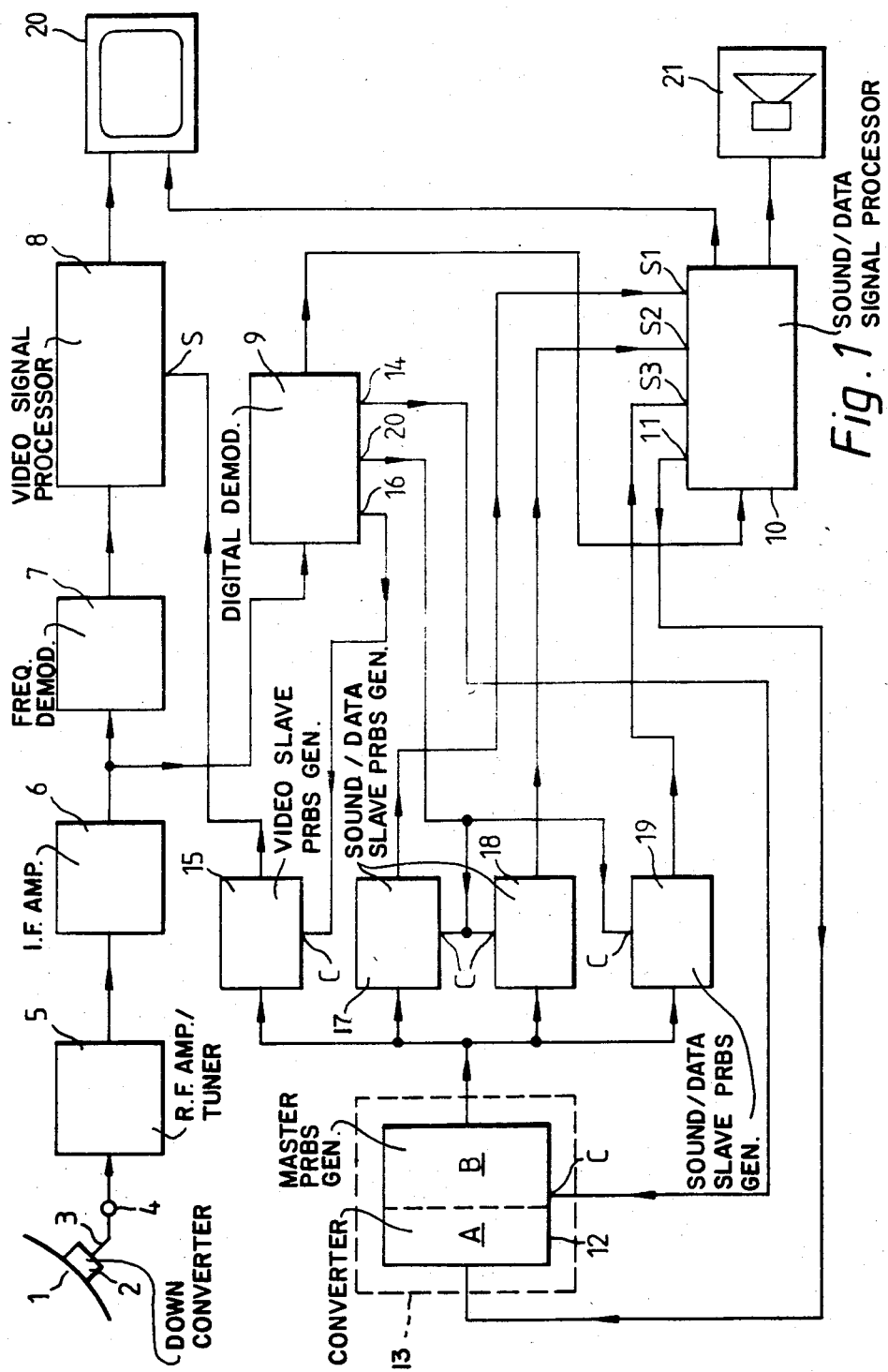
FIG. 1 is a block diagram of a television receiver for use with the present invention.

FIG. 1 shows a block diagram of a television receiver for use with a direct broadcast satellite television transmission system and, in the case of FIG. 1, it is assumed the system used is the C-MAC system along the lines disclosed in the Independent Broadcasting Authorities Experimental Development Report 118/82, entitled "MAC—A Television System for High-Quality Satellite Broadcasting", dated August 1982, pages 6 to 9 of that report disclosing a C-MAC system each television line of which sequentially contains a period of digital sound/data information, a period of compressed chrominance information and a period of compressed luminance information. Each television line is effectively divided into 1296 sample periods at a sampling rate of 20.25 M bits/second, and page 7 contains a table indicating the number of samples alloted to each component. Since the publication of the above report, the number of samples allotted to the various components has been amended, but this is not important for an understanding of the present invention. A draft technical standard for a C-MAC Packet system containing these changes and the construction and positioning of the packets appears in the European Broadcasting Union document SPB 284 dated June 1983 "Draft New Report—Television Standards for 625 line, 12 GHz Satellite Broadcasting".

In FIG. 1 the reference 1 indicates a dish aerial suitable for receiving satellite television signals in the 12 GHz band, the aerial having a down converter 2 attached to it which frequency converts the incoming television signal to a frequency within the 1 to 2 GHz band, depending, of course, on the frequency of the incoming signal. The down converted signal is applied over a co-axial cable 3 to a terminal 4 forming the input for the television receiver, this terminal 4 being connected to an r.f. amplifier and frequency changer (tuner) stage 5 which amplifies and transforms the incoming signal to a suitable i.f. frequency of say 134 MHz which is further amplified by an i.f. amplifier 6. The output of the amplifier 6 is applied to a frequency demodulator 7, as the video components of the broadcast satellite television signal are frequency modulated, the demodulated output of the demodulator 7 being applied to a video signal processor 8 in which the compressed chrominance and luminance components are processed such that they are expanded to occupy a line period and available simultaneously. Under certain circumstances, signals received by the aerial 1 will be scrambled so as to permit ony authorized subscribers to receive the incoming signals in an intelligible manner, in which case the video processor 8 will need to incorporate a de-scrambling stage in which the scrambled vision components are restored to their normal state. One suitable method of scrambling the vision components is known as "line cut" where the chrominance and luminance components for each television line are each cut at randomly determined positions such that each component is divided and the positions of the divided components transposed such that the latter part of a component (that part after the cut) appears before the first part of that component. The cut will not be at the same place in each line but may be made at one of a possible 256 positions. A scrambling key will then be required, which is the same at the transmitter as at the receiver, to provide the necessary information as to where the cut actually takes place and such a key for a possible 256 cut positions per line will need to be an 8-bit binary word per television line. In FIG. 1, such an 8-bit word is applied to the input S of the video signal processor 8.

The output of the i.f. amplifier 6 is also applied to a digital demodulator stage 9 where the incoming digital signals, which are 2–4 PSK modulated, are converted to normal binary form and from which synchronizing information and various clock frequencies are produced. The binary signal output from the digital demodulator stage 9 is applied to a sound/data signal processor 10 in which the various sound and data channels transmitted with the C-MAC signal are separated one from the other and further processed. As in the case with the video signal, some or all of the sound/data channels may also be scrambled to prevent unauthorized reception of this information, and again it will be necessary to provide a scrambling key, or keys, for these sound/data channels to ensure their de-scrambling. The sound/data channels are assumed to be packet multiplexed, where a plurality of packets from the different sound/data channels are assembled during a given period. One proposal for use with the C-MAC television system is that 162 such packets for 8 sound/data channels shall be present during each television frame. A scrambling technique which can be used with the digital sound/data channels is that where the unscrambled digital signal is added to a pseudo random sequence by means of an exclusive OR-gate.

In order to reproduce the various scrambling required in the receiver, a slow rate encryption key is transmitted with the broadcast television signal, preferably with the sound/data components, and which is hence received by the aerial 1, a suitable rate for this encryption key being one byte per second or one byte every two seconds with each byte containing, for example, 64 bits to the Data Encryption Standard (D.E.S.). This encryption key is separated from the incoming digital information by the sound/data signal processor 10 and appears at an output 11 thereof for application to an integrated circuit 12 which may be mounted on a plastic card (of a similar size to a credit card) which the subscriber obtains and which is inserted into an appropriate aperture in the television receiver, which aperture contains suitable connections which make contact with corresponding contacts on the card. The card itself is indicated by the broken line 13. The integrated circuit 12 contains a converter 12A which produces the inverse of the D.E.S. algorithm to provide de-encrypted control data as a trigger for a master pseudo random binary sequence (PRBS) generator 12B forming part of the integrated circuit 12. The master PRBS generator 12B is a pseudo random number generator which may be a highly secure pseudo random generator according to the Data Encryption Standard producing output sequences of bytes at a rate of one byte per television frame each byte having a pseudo random configuration of 64 bits. The master PRBS generator 12B is set either once per second or once every two seconds, in response to the encryption key, to a particular pulse configuration with the output sequence thereafter being stepped in accordance with its random configuration. In addition, it will be necessary to provide clocking pulses for the master PRBS generator 12B at the appropriate frequency of 1.6 KHz which pulses are obtained from an output 14 of the demodulator stage 9 and applied to a clock input C of the integrated circuit 12. In this way, data being transferred between the television receiver and the master PRBS generator 12B on the card 13 are at suitable low rates, which rates are substantially lower than the sampling rate of 20.25 M bits/second of the C-MAC system or the sound/data rate for one channel (352 K bits/second). The output from the master PRBS generator 12B is applied to a slave pseudo random bit sequence generator 15 for the video signal (vision slave PRBS) generator which may also be of a highly secure type and producing one byte of 8 bits per television line. The output of the video slave PRBS generator 15 is applied to the input S of the video signal processor 8 and forms the scrambling key for the scrambled video signal. The output of the video slave PRBS generator 15 has a pseudo random configuration which is set once per frame to a particular pulse configuration by the output of the master PRBS generator 12B, whereafter the video slave PRBS generator 15 output is stepped in accordance with its random configuration. A clock signal of 125 KHz is derived from an output 16 of the demodulator stage 9 and applied to the clock input C of the video slave PRBS generator 15.

The output of the master PRBS generator 12B is also applied to a number of slave pseudo random pulse sequence generators for the sound and data channels (sound/data PRBS) generators depending on the number of such channels subjected to scrambling. In FIG. 1, three such sound/data slave PRBS generators are shown indicated by the references 17, 18 and 19, and which are respectively associated with first and second sound channels (sound (I), sound (II)) and a data channel. The sound/data slave PRBS generators 17, 18 and 19 may be of a similar type to that of the video slave PRBS generator 15 but the rate at which they produce their pseudo random configuration is that rate at which the packets are received for their respective sound/data channels. Inputs S1, S2 and S3 of the sound/data processor 10, respectively, receive the outputs of the slave PRBS generators 17, 18 and 19, which are applied as respective scrambling keys for the sound/data channels. In the sound/data processor 10, the scrambling keys are used to provide further sequences of pseudo random numbers at the sound/data bit rate required for the de-scrambling of the individual sound/data channels. As with the video slave PRBS generator 15, the sound/data slave PRBS generators are periodically set at frame rate by the output of the master PRBS generator 12B. The sound/data slave PRBS generators 17, 18 and 19 also receive pulse trains of a clock frequency at their clock inputs C from an output 20 of the demodulator stage 9, the clock frequency being dependent on the packet rate at which the scrambling keys are to be produced.

The output of the video signal processor 8 is shown in FIG. 1 to be applied to a display arrangement 20 where the expanded and de-scrambled video components are employed to produce a television display. An output of the sound/data processor 10 is shown connected to a loud-speaker system 21 where the appropriate sound channel is reproduced while a further output of this processor 10 is shown applied to the display 20 for the display of data material, such as teletext.

In the above description, it is assumed that the integrated circuit 12 on the card 13 contains a PRBS generator 12B producing an output of one byte per frame. This is not necessary and the PRBS generator may be omitted so that the output of the integrated circuit corresponds to the rate of the received encryption key i.e. one byte per second or every two seconds which sets the slave PRBS generators 15, 17, 18 and 19.

Television transmission equipment for use with the present invention is shown in FIG. 2, in which a video signal source 23, which may be a television camera or a video tape recorder, has its output connected to a video signal processor 24 in which, if the signal is for the C-MAC system, the chrominance and luminance components will be compressed in the known manner. In addition, if the video signal is to be scrambled (such as by the above described "line cut" method), the scrambling of the video components will also take place in the video signal processor 24. The output from the video signal processor 24 is applied to a frequency modulator 25 and the modulated output applied to a suitable transmitter 27 via an adder circuit 26, the transmitter 27 producing a modulated output in the 12 GHz band from which it will be applied to a suitable aerial system 28 from which it can be beamed-up to the satellite. In order to generate the necessary scrambling key for the scrambling of the video signal, a random control data signal is generated by a random control data generator 29, which control signal is the same as that required in the receiver in FIG. 1, the rate at which the control signal is generated being controlled by clock pulses received at an input C from a clock frequency generator 30 which produces clock pulses at this and other frequencies. The control signal from control generator 29 is applied to a converter stage 22 where the control signal is encrypted to the Data Encryption Standard to produce an encryption key. This encryption key is applied to an input of a sound/data signal processor 31 where the encryption key is inserted either once per second or once every two seconds in the sound/data components of the C-MAC signal. The 2-4 PSK modulated output of the sound/data processor 31 is applied to a second input of the adder circuit 26 for addition to the video components prior to transmission.

The control signal from the control data generator 29 is also applied to a master pseudo random binary sequence (PRBS) generator 32 which is of the same type and produces the same pseudo random output as the corresponding master PRBS generator 12B in the receiver and which is set at the same time as that in the receiver to the same particular pulse configuration. Clock signals of frequency 1.6 KHz are applied to the clock input C of the master PRBS generator 32 from the generator 30. The output of the master PRBS generator 32 is at frame rate and is applied to a video slave pseudo random binary sequence generator 33 which is of the same type and produces the same pseudo random output as the corresponding video slave PRBS generator 15 in the receiver. This produces the same 8 bits per byte pseudo random sequence with one byte appearing on each line, the video slave PRBS generator 33 being periodically set at the same time as the vision slave PRBS generator 15 in the receiver to the same particular pulse configuration. The output of the video slave PRBS generator 33 forms the scrambling key for the scrambling of the video signal and is applied to an input S of the video signal processor 24 to control the line cut point for each television line.

Sources of sound signals 34 and 35 (sound I and sound II) are also applied to the sound/data signal processor 31 as is a data signal source 36, the sound/data signal processor 31 processing the various inputs into a packet multiplex form as used with the transmission. These sound and data signals may also be scrambled to prevent unauthorized reception, and for this purpose, the output of the master PRBS generator 32 is applied to respective sound/data slave pseudo random binary sequence generators (sound/data slave PRBS) generators 37, 38 and 39 which correspond with the slave PRBS generators 17, 18 and 19 in the receiver and produce corresponding outputs which are set to particular pulse configurations at the same time as for those in the receiver.

The outputs of these sound/data slave PRBS generators 37, 38 and 39 are applied to respective inputs S1, S2 and S3 of the sound/data processor 31 to form the scrambling keys for the scrambling of the sound and data channels at packet level. In the sound/data processor 31, the scrambling keys are used to provide further sequences of pseudo random numbers at the sound/data bit rate required for scrambling the individual sound-/data channels. In the same way as for the receiver in FIG. 1, the video and sound/data slave PRBS generator 33, 37, 38 and 39 will receive clock signals at their clock inputs C, that for the video slave PRBS generator 33 being at 125 KHz and derived from an output of the generator 30 while that for the remaining slave PRBS generators 37, 38 and 39 being at the appropriate frequency as previously described and also being derived from the generator 30.

As with the receiver equipment, it is not essential to incorporate a master PRBS generator 32 in the transmitter, which may be omitted and the slave PRBS generators 33, 37, 38 and 39 set by the control data from the control data generator 29.

What is claimed is:

1. A television transmission system in which the video components of a transmitted television signal are scrambled to allow only for their authorized reception, a video scrambling key being provided for the line-by-line scrambling or de-scrambling of said video components, said video scrambling key comprising a first pulse signal, having a first pseudo random configuration, generated at a first rate which corresponds to that of the line frequency, the first pulse signal being periodically set, in response to control data having a rate which is low compared with that of the line frequency, to a particular pulse configuration, which first pulse signal thereafter is stepped in accordance with its random configuration, characterized in that said television signal additionally contains digitally modulated sound or data components which are packet multiplexed such that individual packets represent a sound or a data component, said packets being time-division-multiplexed within periods allotted in said television signal, one of said sound/data components being scrambled to allow only for authorized reception, a packet scrambling key being provided for the packets of the sound/data component which is to be scrambled or de-scrambled, said packet scrambling key comprising a second pulse signal, having a second pseudo random configuration, generated at a second rate corresponding to the rate at which said packets appear either prior to or after multiplexing or demultiplexing, the second pulse signal being periodically set, in response to said control data, to a particular pulse configuration, which second pulse signal thereafter is stepped in accordance with its random configuration.

2. A transmission system as claimed in claim 1, characterized in that further of said sound/data components are scrambled to allow only for their authorized reception, a separate packet scrambling key being provided for the packets of each further sound/data component which is to be scrambled or de-scrambled, said separate packet scrambling keys comprising further second pulse signals, each having a pseudo random configuration, generated at the rates at which the packets of the further sound/data components appear, either prior to or after multiplexing or demultiplexing, said further second pulse signals being periodically set, in response to said control data, to respective particular pulse configurations, which further second pulse signals thereafter are stepped in accordance with their random configuration.

3. A transmission system as claimed in claim 1 or 2, characterized in that a third pulse signal having a third pseudo random configuration is generated at a rate less than that of said line frequency but greater than that of said control data, said third pulse signal being periodically set, by said control data, to a particular pulse configuration, which third pulse signal thereafter is stepped in accordance with its random configuration, the, or each, second pulse signal being periodically set by said third pulse signal.

4. A transmission system as claimed in claim 3, characterized in that said third pulse signal has a rate which corresponds to the frame frequency of said television signal.

5. A transmission system as claimed in claim 1, or 2 characterized in that said control data is conveyed in encrypted form as an encryption key which forms part of the transmission with said sound/data components.

6. Television transmission equipment for generating a television signal for use with a television transmission system in which the video components of a transmitted television signal are scrambled to allow only for their authorized reception, said equipment comprising a source of video components, means for performing line-by-line scrambling of said video components, under the control of a video scrambling key, to allow only for their authorized reception, means for generating control data at a rate which is low compared with the line frequency of said television signal, means for generating a first pulse signal, having a first pseudo random configuration, at a first rate corresponding to that of said line frequency, said first pulse signal forming the video scrambling key, means for periodically setting said first pulse signal, in response to said control data, to a particular pulse configuration, which first pulse signal is thereafter stepped in accordance with its random configuration, and means for applying said scrambled video components as part of a television signal to a transmission medium, characterized in that said equipment additionally comprises sources of digitally modulated sound or data components, means for packet multiplexing said sound/data components such that individual packets represent a sound or a data component, said packets being multiplexed within allotted periods, means for scrambling one of said sound/data components under the control of a packet scrambling key to allow only for authorized reception, means for generating a second pulse signal, having a second pseudo random configuration, at a second rate corresponding to the rate at which said packets appear, either prior to or after multiplexing, said second pulse signal forming said packet scrambling key, means for periodically setting said second pulse signal, in response to said control data, to a particular pulse configuration, which second pulse signal is thereafter stepped in accordance with its random configuration, and means for applying said packet multiplexed sound/data components as part of said television signal to the transmission medium.

7. Transmission equipment as claimed in claim 6, characterized in that said equipment further comprises means for scrambling further of said sound/data components, each under the control of a separate packet scrambling key, to allow only for authorized reception, means for generating further second pulse signals, each having a pseudo random configuration, at rates at which the packets of the further sound/data components appear, either prior to or after multiplexing, said further second pulse signals forming the respective separate packet scrambling keys, means for periodically setting said further second pulse signals, in response to said control data, to particular pulse configurations, which further second pulse signals are thereafter stepped in accordance with their random configurations.

8. Transmission equipment as claimed in claim 6 or 7, characterized in that said equipment additionally contains means for generating a third pulse signal, having a third pseudo random configuration, at a rate which is less than that of the or each further second pulse signals, but greater than that of said control data, means for periodically setting said third pulse signal by said control data, to a particular pulse configuration, which third pulse signal thereafter is stepped in accordance with its random configuration, and means for periodically setting the, or each, further second pulse signal by said third pulse signal.

9. Transmission equipment as claimed in claim 8, characterized in that said means for generating said third pulse signal generates said third pulse signal at a rate corresponding to the frame frequency of said television signal.

10. Transmission equipment as claimed in claim 6 or 7, characterized in that said equipment further comprises means for encrypting said control data to form an encryption key which encryption key forms one of the sound/data components.

11. Television receiving equipment for use with television transmission equipment as claimed in claim 6, in which the video components of a television signal are scrambled to allow only for their authorized reception, said equipment comprising means for receiving said television signal and for deriving the scrambled video components therefrom, means for performing line-by-line descrambling of said scrambled video components under the control of a video scrambling key, means for generating a first pulse signal, having a first pseudo random configuration, at a first rate corresponding to that of the line frequency, said first pulse signal forming said video scrambling key, means for periodically setting said first pulse signal, in response to received control data having a rate which is low compared with that of the line frequency, to a particular pulse configuration, and which first pulse signal is thereafter stepped in accordance with its random configuration, characterized in that said television signal additionally contains digitally modulated sound or data components which are packet multiplexed such that individual packets represent a sound or a data component, said packets being time-division-multiplexed within periods allotted in said television signal, one of said sound/data components being scrambled to allow only for authorized reception, said equipment additionally comprising means for deriving said one scrambled sound/data component from said received television signal, means for performing descrambling of said scrambled sound/data component under the control of a packet scrambling key, means for generating a second pulse signal, having a second pseudo random configuration, at the second rate corresponding to the rate at which said packets appear, either prior to or after de-multiplexing, said second pulse forming said packet scrambling key, means for periodically setting said second pulse signal, in response to said received control data, to a particular pulse configuration, which second pulse signal is thereafter stepped in accordance with its random configuration.

12. Receiving equipment as claimed in claim 11, characterized in that said television signal has further of said sound/data components which are scrambled to allow only for their authorized reception, said equipment further comprising means for deriving said further scrambled sound/data components from said received television signal, means for performing descrambling of said further scrambled sound/data components under the control of separate packet scrambling keys, means for generating further second pulse signals, each having a pseudo random configuration, at rates at which the packets of the further scrambled sound/data components appear, either prior to or after demultiplexing, said further second pulse signals forming the respective separate packet scrambling keys, means for periodically setting said further second pulse signals, in response to said received control data, to particular pulse configurations, which further second pulse signals are thereafter stepped in accordance with their random configurations.

13. Receiving equipment as claimed in claim 11 or 12, characterized in that said equipment additionally comprises means for generating a third pulse signal, having a third pseudo random configuration, at a rate which is less than that of said control data, means for periodically setting said third pulse signal, by said received control data, to a particular configuration, which third pulse signal thereafter is stepped in accordance with its random configuration, and means for periodically setting the, or each, further second pulse signal by said third pulse signal.

14. Receiving equipment as claimed in claim 13, characterized in that said means for generating said third pulse signal generates said third pulse signal at a rate corresponding to the frame frequency of said television signal.

15. Receiving equipment as claimed in claim 11 or 12 characterized in that said control data is conveyed in the sound/data components of said television signal in encrypted form as an encryption key, said equipment further comprising means for deriving said encryption key from said sound/data components and means for decrypting said encryption key to produce said control data.

16. Receiving equipment as claimed in claim 13, characterized in that said control data is conveyed in the sound/data components of said television signal in encrypted form as an encryption key, said equipment further comprising means for deriving said encryption key from said sound/data components and means for decrypting said encryption key to produce said control data.

17. Receiving equipment as claimed in claim 14, characterized in that said control data is conveyed in the sound/data components of said television signal in encrypted form as an encryption key, said equipment further comprising means for deriving said encryption key from said sound/data components and means for decrypting said encryption key to produce said control data.

18. A transmission system as claimed in claim 3, characterized in that said control data is conveyed in encrypted form as an encryption key which forms part of the transmission with said sound/data components.

19. A transmission system as claimed in claim 4, characterized in that said control data is conveyed in encrypted form as an encryption key which forms part of the transmission with said sound/data components.

20. Transmission equipment as claimed in claim 8, characterized in that said equipment further comprises means for encrypting said control data to form an encryption key which encryption key forms one of the sound/data components.

21. Transmission equipment as claimed in claim 9, characterized in that said equipment further comprises means for encrypting said control data to form an encryption key which encryption key forms one of the sound/data components.

* * * * *